(12) United States Patent
Carrasco Zanini et al.

(10) Patent No.: US 11,077,935 B2
(45) Date of Patent: Aug. 3, 2021

(54) THRUSTER BASED LOCOMOTION FOR PERCHED UNMANNED AERIAL VEHICLES

(71) Applicant: Saudi Arabian Oil Company, Dhahran (SA)

(72) Inventors: Pablo Carrasco Zanini, Makkah (SA); Hassane Trigui, Makkah (SA)

(73) Assignee: Saudi Arabian Oil Company, Dhahran (SA)

( * ) Notice: Subject to any disclaimer, the term of this patent is extended or adjusted under 35 U.S.C. 154(b) by 761 days.

(21) Appl. No.: 15/688,319

(22) Filed: Aug. 28, 2017

(65) Prior Publication Data
US 2019/0061922 A1    Feb. 28, 2019

(51) Int. Cl.
*B64C 25/10*  (2006.01)
*B64C 39/02*  (2006.01)
*B64C 25/34*  (2006.01)
*B64C 1/06*   (2006.01)
*B64C 25/32*  (2006.01)

(52) U.S. Cl.
CPC .............. *B64C 25/10* (2013.01); *B64C 1/061* (2013.01); *B64C 25/34* (2013.01); *B64C 39/02* (2013.01); *B64C 39/024* (2013.01); *B64C 2025/325* (2013.01); *B64C 2201/108* (2013.01); *B64C 2201/123* (2013.01); *B64C 2201/141* (2013.01); *B64C 2201/165* (2013.01); *B64C 2201/18* (2013.01)

(58) Field of Classification Search
CPC ................ B64C 2201/18; B64C 25/10; B64C 2201/108
See application file for complete search history.

(56) References Cited

U.S. PATENT DOCUMENTS

| 1,777,941 | A | * | 10/1930 | Szakacs | .................. B64C 31/04 244/50 |
| 8,464,981 | B2 | | 6/2013 | Goldie et al. | |
| 8,794,564 | B2 | | 8/2014 | Hutson | |

(Continued)

FOREIGN PATENT DOCUMENTS

| JP | 2017061298 A | 3/2017 |
| JP | 6178949 B1 | 8/2017 |
| WO | WO 2016/164416 | 10/2016 |

OTHER PUBLICATIONS

Myeong W.C. et al., "Drone-Type Wall-Climbing Robot Platform for Structural Health Monitoring," in 6$^{th}$ International Conference on Advances in Experimental Structural Engineering, Aug. 2015.

(Continued)

*Primary Examiner* — Brian M O'Hara
(74) *Attorney, Agent, or Firm* — Leason Ellis LLP

(57) ABSTRACT

A system for landing and locomoting on a surface of a structure comprises an unmanned aerial vehicle having a plurality of independently controllable thrusters and an undercarriage including a frame with wheels at corners. The undercarriage further includes a plurality of bars pivotally coupled at respective first ends to the frame and coupled at respective second ends to the unmanned aerial vehicle; wherein the unmanned aerial vehicle is operative to differentially activate the plurality of thrusters so as to tilt with respect to the frame of the undercarriage and to cause a net resultant force on the undercarriage to locomote on the surface of the structure.

17 Claims, 11 Drawing Sheets

(56) References Cited

U.S. PATENT DOCUMENTS

| | | | |
|---|---|---|---|
| 10,099,778 B2* | 10/2018 | Sugaki | B64C 27/08 |
| 10,384,772 B2* | 8/2019 | Yamada | B64C 1/08 |
| 10,633,112 B2* | 4/2020 | Yamada | B64C 39/024 |
| 2016/0122018 A1 | 5/2016 | Matsue et al. | |
| 2017/0050726 A1 | 2/2017 | Yamada et al. | |
| 2017/0123435 A1 | 5/2017 | Myeong et al. | |
| 2019/0127052 A1* | 5/2019 | Chen | B64C 25/24 |

OTHER PUBLICATIONS

Beardsley P. et al., "VertiGo-A Wall-Climbing Robot including Ground-Wall Transition" retrieved from https://www.disneyresearch.com/publication/vertigo/ on Sep. 19, 2017.

RC Groups Update, "'B' the flying Car" retrieved from https://www_rcgroups.com/forums/showthread.php?1918906-B-the-Flying-Car on Sep. 10, 2017.

Examination Report in Corresponding Gulf Coast Application No. 2018-35898 dated Jul. 15, 2020. 4 pages.

Written Opinion in corresponding Singapore Patent Application No. 11202001419P, dated Feb. 17, 2021. 6 pages.

* cited by examiner

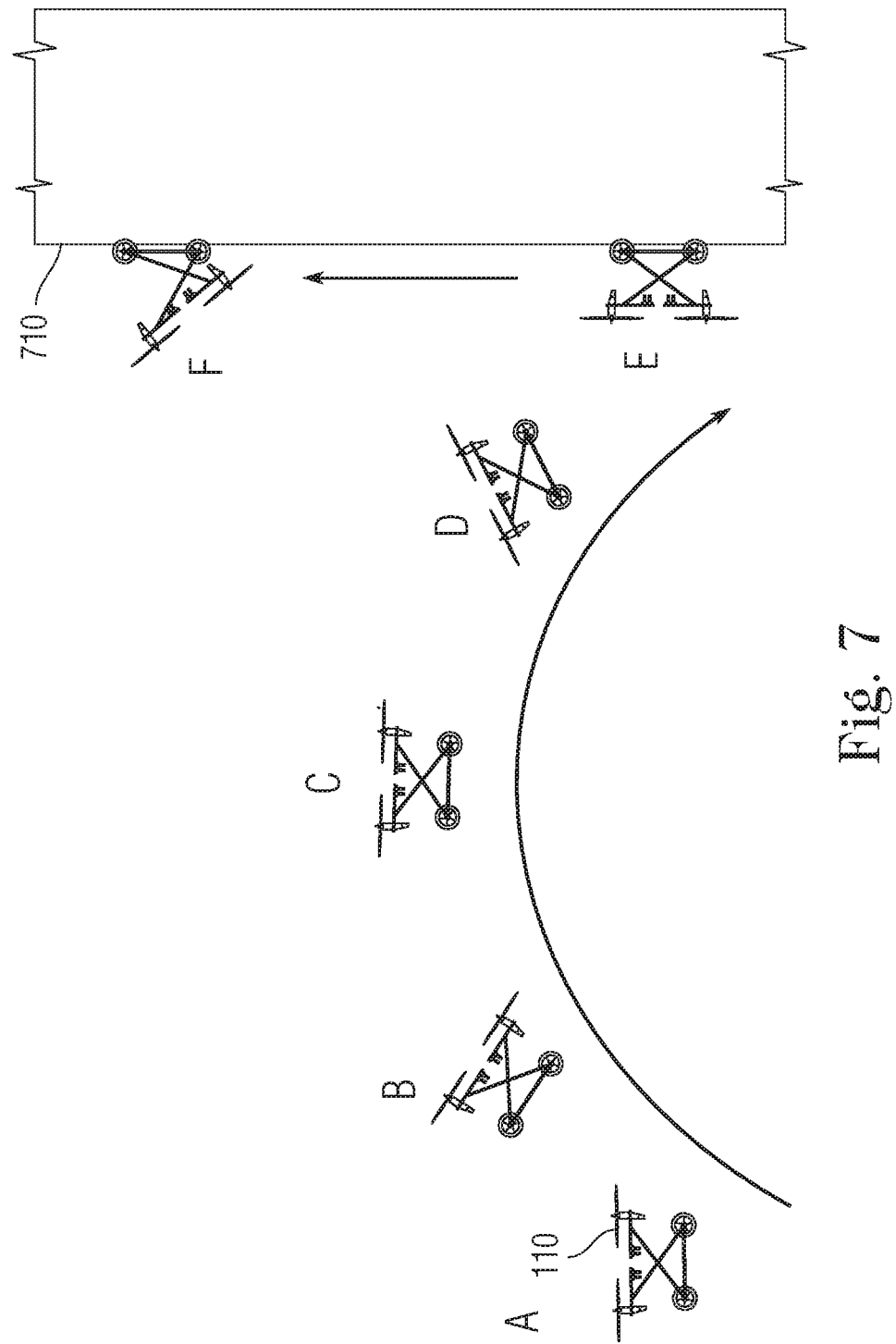

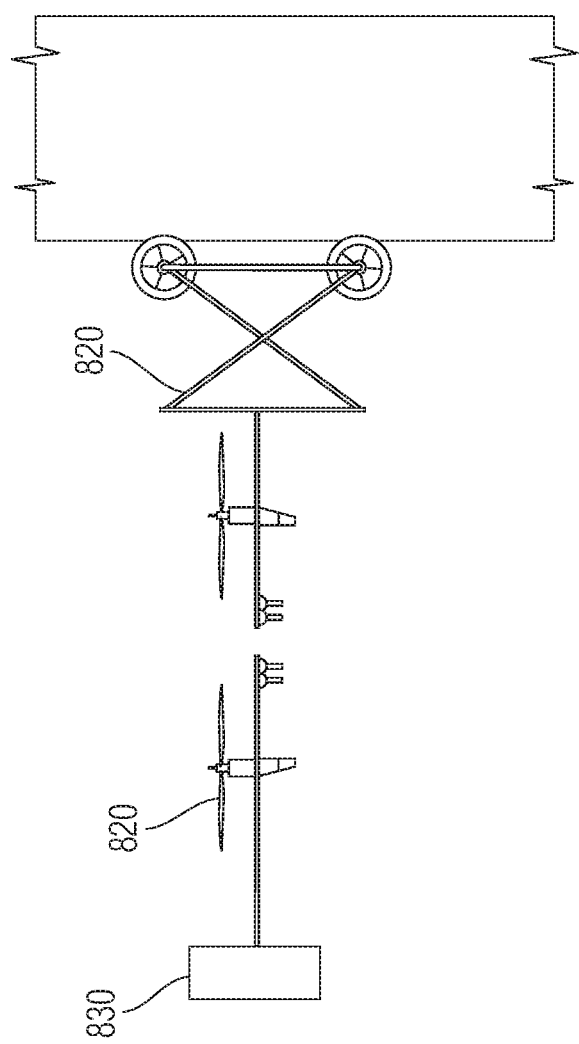

THRUSTER BASED LOCOMOTION FOR PERCHED UNMANNED AERIAL VEHICLES

FIELD OF THE INVENTION

The present invention relates to unmanned aerial vehicles (UAVs) and in particular relates to a method and system for enabling a UAV to maintain contact with and move upon a surface of a structure.

BACKGROUND OF THE INVENTION

Unmanned aerial vehicles (UAVs), also referred to as drones, are becoming a ubiquitous technology that is used in numerous applications. UAVs are now widely used for entertainment, hobby, racing, filmography, photography, aerial surveying and mapping, etc. One of the more common types of UAV uses multiple rotors and flies and hovers in a manner analogous to a helicopter. Depending on their specific configuration, UAVs can offer great agility in mid-air and the ability to carry a variety of instruments and sensors to locations that are otherwise difficult to access. The size of UAVs tends to impose some limitations in terms of battery capacity and payload. For example, few commercially available UAVs can remain in flight for longer than an hour, and the more instruments that they carry, the more energy they expend in flight, resulting a trade-off between payload and maximum flight time.

To save battery capacity, it is advantageous to have UAVs perform as many tasks as possible while mounted or perched on a surface. Providing UAVs with the ability to locomote on a surface once perched could significantly widen the range of applications for drones since the UAVs could potentially reach places that are otherwise unreachable and benefit from applications which depend on contact-based sensors and instruments as opposed to only ranged devices (e.g. ultrasonic pipe inspection).

While research laboratories at many institutions have made significant advancements in the field of hybrid vehicles that can achieve a combination of flying, land locomotion and/or climbing, to date no technology offers both the ability to fly and the ability to locomote on surfaces of any orientation (e.g. vertical, horizontal, inclined or upside down horizontal).

It would therefore be advantageous to provide a system and method for enabling a UAV to locomote on surfaces of any orientation, and in particular to provide a solution that does not require additional actuators beyond those provided in standard UAVs.

SUMMARY OF THE INVENTION

Embodiments of the present invention include a system for landing and locomoting on a surface of a structure. The system comprises an unmanned aerial vehicle having a plurality of independently controllable thrusters and an undercarriage including a frame, a set of wheels coupled to the frame, and a plurality of bars pivotally coupled at respective first ends to the frame and at respective second ends to the unmanned aerial vehicle. The unmanned aerial vehicle is operative to differentially activate the plurality of thrusters so as to tilt with respect to the frame of the undercarriage and to exert a net resultant force that causes the undercarriage to locomote on the surface of the structure.

In some implementations, the plurality of bars includes four bars configured in an X-shaped arrangement. In some implementations, the set of wheels of the undercarriage includes four wheels and the undercarriage includes pressure sensors operative to indicate of a force of contact between the set of wheels and the surface of the structure. The unmanned aerial vehicle can include an optical sensor and the processor can be configured with program code for image processing and identification.

The unmanned aerial vehicle includes a processor that can be configured with program code for controlling kinetic behavior of the unmanned aerial vehicle according to various kinetic modes including a flight mode, a locomotion mode, and a perch mode. In some implementations of the flight mode, the processor determines a location and orientation of the surface of the structure relative to the unmanned aerial vehicle and calculates a) a trajectory for landing the unmanned aerial vehicle onto a target location on the surface of the structure from an airborne position based on the determined location and orientation, and b) a sequence in which to activate and deactivate the thrusters in order to move in the calculated trajectory. In some implementations of the perch mode the processor determines an orientation of the undercarriage with respect to gravity and the surface of the structure and activates the thrusters so as to keep the wheels of the undercarriage in contact with the surface of the structure. In some implementations of the locomotion mode, the processor determines a location and an orientation of the undercarriage with respect to gravity and the surface of the structure and calculates a trajectory for locomoting the unmanned aerial vehicle on the surface of the structure to a target location on the structure based on the determined location and orientation.

At least one of the undercarriage and the unmanned aerial vehicle includes equipment for inspecting the surface of the structure. In some embodiments, to simplify locomotion, the wheels of the undercarriage can include Omni-wheels or mecanum wheels.

Embodiments of the present invention also include a method of landing and locomoting on a surface of a structure using an unmanned aerial vehicle having controllable thrusters. The method comprises coupling an undercarriage including a frame, a set of wheels coupled to the frame and a plurality of pivotable bars to the unmanned aerial vehicle, and controlling the thrusters of the unmanned aerial vehicle so as to tilt the pivotable bars of the undercarriage with respect to the frame and exert a resultant force on the undercarriage that causes the undercarriage to locomote on the surface of the structure.

Any combinations of the various embodiments and implementations disclosed herein can be used.

These and other aspects, features, and advantages can be appreciated from the following description of certain embodiments of the invention and the accompanying drawing figures and claims.

BRIEF DESCRIPTION OF THE DRAWINGS

FIG. 7 depicts an example approach and landing sequence for a UAV and undercarraige on a vertical pipe according to an embodiment of the present invention.

FIG. 8 depicts a UAV having an undercarriage mounted at a 90-degree angle according to an embodiment of the present invention.

It is noted that the drawings are illustrative and not necessarily to scale.

DETAILED DESCRIPTION CERTAIN OF EMBODIMENTS OF THE INVENTION

It is initially noted that the terms "locomote" and "locomotion" as used herein refer to motion on and along a surface, in contrast to airborne flight.

By way of overview, the present invention provides a light weight passive undercarriage as a mounting station for a UAV. When mounted on the undercarriage, the UAV can perch or locomote on a surface in a variety of orientations solely by activating the thrusters (e.g., rotors). For example, the UAV/undercarriage system perch and move upside down or vertically. As the undercarriage is a passive device and does not include additional actuators, the weight of the undercarriage can be kept to a minimum by using strong, yet lightweight materials. In this manner, the present invention enables a UAV to achieve any combination of flying, climbing, driving and perching while minimizing payload and maximizing flight/operating time. In some embodiments, the undercarriage comprises an 'X' shaped 4-bar linkage couples to a passive 4-wheel carriage. When mounted on the carriage, the UAV is able to tilt relative to the undercarriage and can locomote on a surface by adjusting the amount of force applied by the thrusters.

Figure 1:
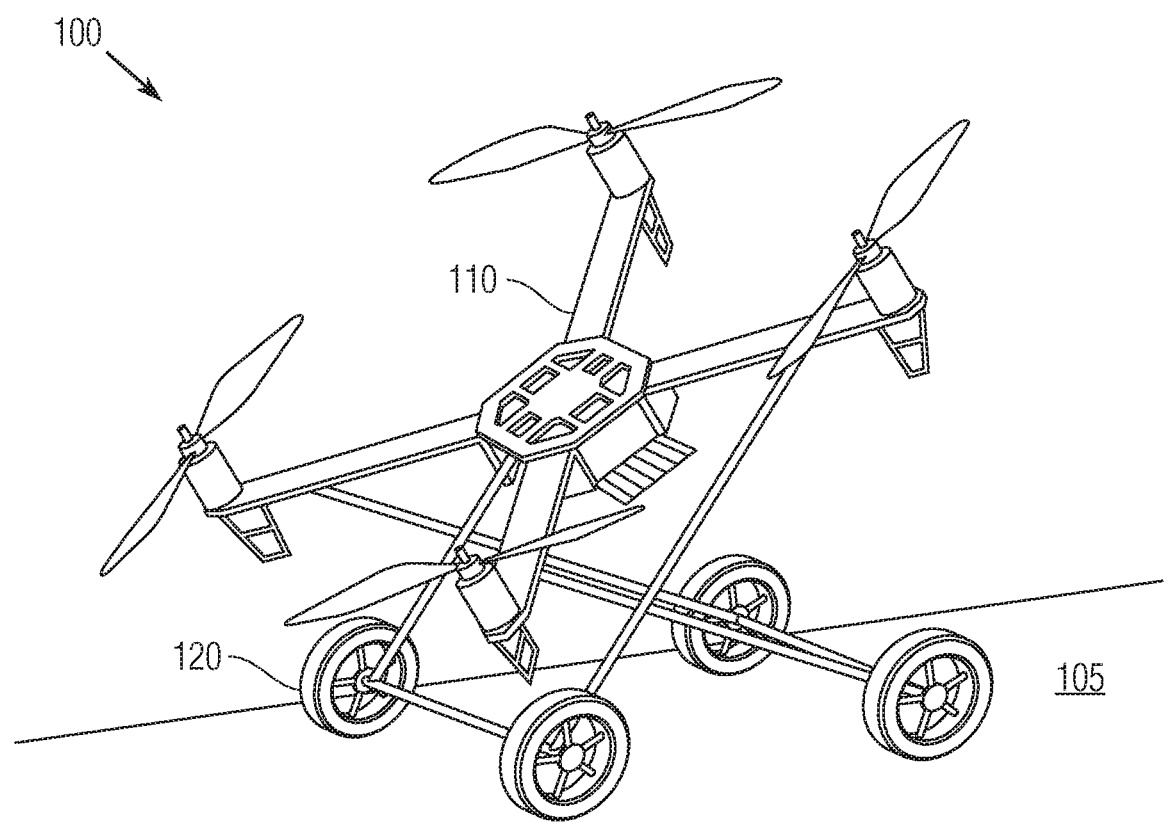
FIG. 1 is a perspective view of a UAV mounted on an undercarriage for locomotion according to an embodiment of the present invention.

FIG. 1 shows a system 100 for landing and locomoting on a structure that includes a UAV 110 coupled to an undercarriage attachment 120 ("undercarriage") for perching and locomotion on a surface of a structure 105. The UAV 110 is a remote-controllable flying device that can be used in numerous applications and is particularly suited for accessing locations that are difficult to access for human personnel for monitoring or task-performance purposes. Common UAVs are designed similarly to helicopters but usually include multiple, smaller rotors rather than a single large rotor. One model that is used prevalently includes fours rotors arranged at corners and is referred to as a quadrotor. The undercarriage 120 includes a bottom rectangular frame 122 having corners upon which wheels e.g., 123, 124 are mounted. The wheels 123, 124 are intended to directly contact the surface of a structure for purposes of locomotion. Linkage bars 131, 132, 133, 134 are pivotably attached at their first ends to each of the respective corners of the frame 122. The second ends of linkage bars 131-134 are coupled to the UAV 110 in an X-shaped arrangement. The entire undercarriage including frame 122 and linkage bars 131-134 can be made from strong, lightweight materials such as carbon fiber, aluminum or 3D printed and/or injection molded plastics. For many applications, the undercarriage can have a weight in the range of 100-600 grams. The undercarriage 120 can be configured to be fixed or detachable from the UAV 110. In most embodiments the UAV 110 can mount directly on top of the undercarriage 120, but for certain applications the UAV can be mounted at an angle with respect to the undercarriage, such as 90 degrees. The undercarriage can carry sensors and instruments for various inspection and diagnostic purposes including inspection, telemetry, environmental sensing, capturing footage, etc. Examples of such sensors and instruments known in the art include ultrasonic thickness and phase array probes, CP probes, electromagnetic acoustic transducer (EMAT) probes, pulsed eddy current probes, phased cameras, infrared sensors, acoustic sensors, gas sensors, laser range finders, LiDARs, capacitive sensors, inductive sensors, and hall effect sensors.

Figure 2:
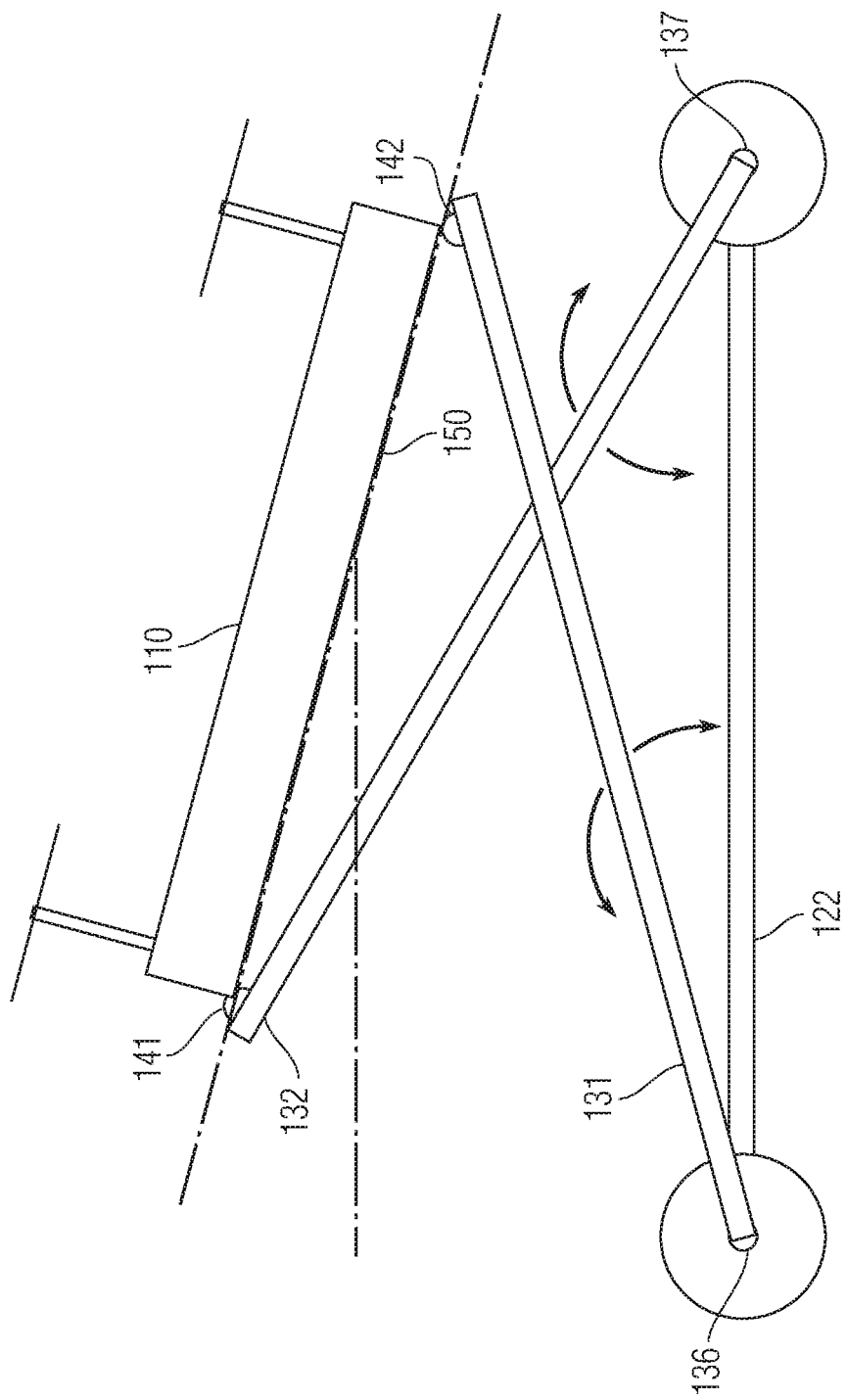
FIG. 2 is an enlarged schematic view of a UAV mounted on an undercarriage according to an embodiment of the present invention.

Aspects of the undercarriage are more clearly depicted in FIG. 2 which shows two of the four linkage bars 131, 132 of the undercarriage. The frame 122 of the undercarriage defines a horizontal axis. As indicated a first end of linkage bar 131 is pivotally coupled to the frame 122 at corner 136. Linkage bar 131 can rotate freely clockwise or counterclockwise with respect to the frame in the directions shown. The second end of linkage bar 131 is securely coupled to a mounting element 142 of the UAV, which is horizontally opposite from corner 136. Similarly, linkage bar 132 is pivotally coupled to frame 122 at corner 137 and can also rotate freely in clockwise or counterclockwise with respect to the frame. The second end of linkage bar 132 is securely coupled to a mounting element 144 of the UAV, which is horizontally opposite from corner 137. Mounting elements 142, 144 can be implemented using pivoting joints such as hinges. The second ends of linkage bars 131, 132 in effect define a platform axis 150 upon which the UAV is seated. The coupling of ends of linkage bars 131, 132 to horizontally opposite positions causes bars 131, 132 to cross one another in an X-shaped configuration. When viewed together as a unit, linkages 131-134 are referred to herein as a "4-bar linkage." The ability of the linkage bars 131-134 to pivot at their first ends allows the second ends a degree of freedom which enables the platform 150 to tilt with respect to the horizontal axis as shown in FIG. 2. In some embodiments, the 4-bar linkage can be configured to be neutrally centered with a simple suspension system that biases the linkage toward the central position using spring forces, enabling the UAV to remain stably centered in the absence of a thrust intended to cause tilting.

To locomote on a surface of a structure using the undercarriage, the UAV performs two related functions: maintaining the stability of the undercarriage on the structure, i.e., accounting for and balancing gravitational forces, and providing an unbalanced thrust to cause the undercarriage to move on the surface in a desired direction. As described further below, a control unit of the UAV determines the amount of thrust applied by each of the thrusters in order to achieve both stability and locomotion.

Figure 3C:
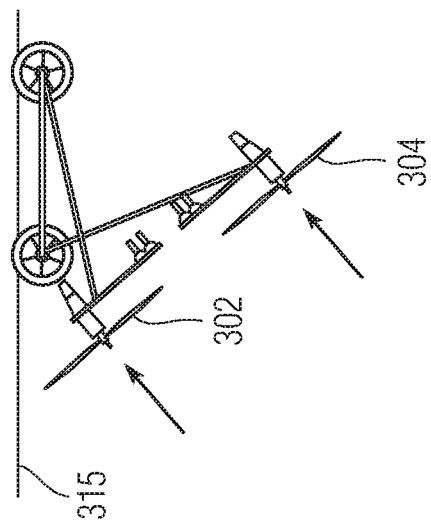
FIGS. 3A, 3B and 3C depict a locomotion sequence of a UAV and undercarriage system according to an embodiment of the present invention.
Figure 3B:
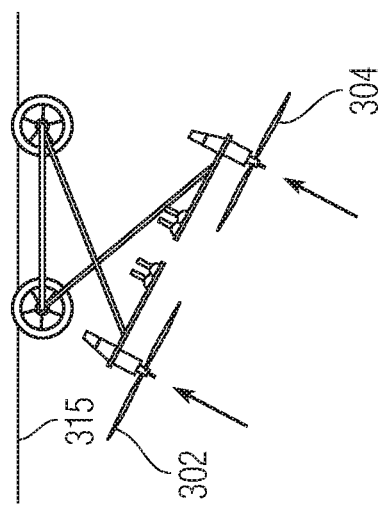
Figure 3A:
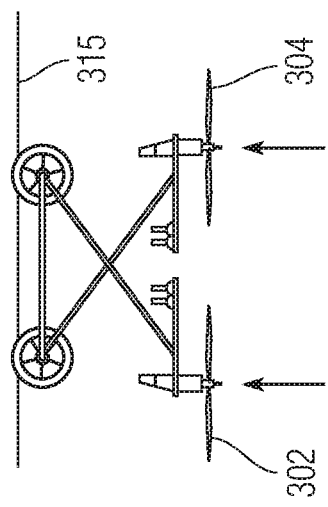

FIGS. 3A, 3B and 3C depict a locomotion sequence of a UAV and undercarriage system according to an embodiment of the present invention. At the start of the sequence, depicted FIG. 3A, rear thrusters 302 and front thrusters 304 of a UAV 310 apply an approximately equal amount of upward force to maintain the undercarriage on a surface of a structure 315, such as a pipe, against the force of gravity. After the start, the amount of thrust applied by the left (rear) thruster begins to exceed the amount of thrust applied by the right (front) thrusters. The differential thrust causes the UAV to tilt in a clockwise direction with respect to the horizontal plane, and also produces a net resultant force that cause the undercarriage to locomote to the right along the surface 315, longitudinally. FIG. 3B depicts a mid-point of the sequence in which the UAV is tilted with respect to the horizontal plane and the undercarriage has moved a distance to the right along the structure. FIG. 3C depicts the last part of the sequence in which the UAV has tilted further with respect to the horizontal plane and moved further to the right along the structure.

Figure 4A:
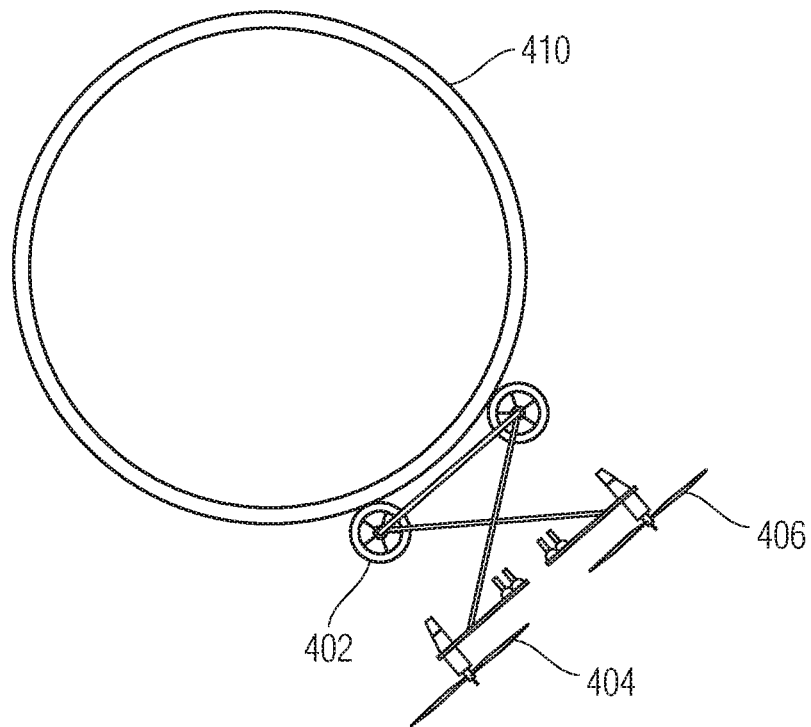
FIGS. 4A and 4B depict a sequence in which a UAV and undercarriage system performs a circumferential locomotion around a cylindrical structure according to an embodiment of the present invention.
Figure 4B:
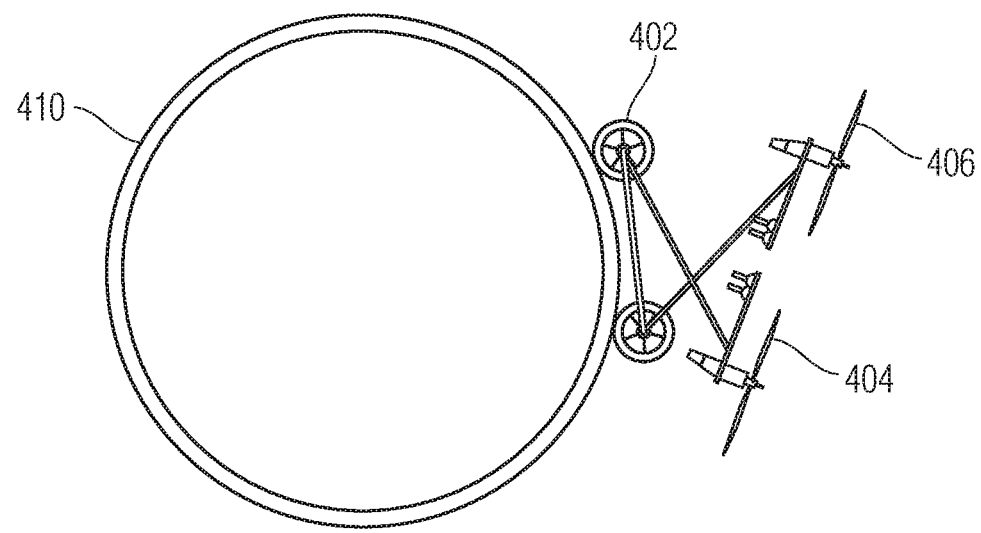

FIGS. 4A and 4B depict a sequence in which a UAV/undercarriage system performs a circumferential locomotion around a cylindrical structure. In FIG. 4A the 4-bar linkage 402 is approximately centered. In FIG. 4B, a relative increase in the force of rear thrusters 404 relative to front thrusters 406 causes the UAV to tilt clockwise with respect to the undercarriage and also produces a net resultant force that causes the undercarriage to locomote in a counterclockwise direction around the surface of the structure 410.

The balance between locomotive thrust and attachment thrust can be controlled in a closed loop fashion using different combinations of feedback from sensors. The sensors can include one or more of wheel encoders, rotary position sensors measuring the angle(s) at the pivoting joints of the 4-bar linkage, inertial measurement units (IMUs) that detect an orientation of at least one of the UAV and the undercarriage, and pressure sensors on one or more of the carriage wheels, among others. The data provided by wheel pressure sensors can also be used in to optimize power consumption. For example, measurement data obtained from the wheel pressure sensors can indicate that the force being applied by the UAV thrusters is in excess of a level sufficient to achieve a remain attached to a target surface and/or a desired locomotion trajectory.

It can be advantageous to fix the angle of the X-bar linkage at selectable times to cause the UAV to behave as a rigid body. This can minimize any pendulum effect disturbance and optimize thrust. By fixing the angle of the linkage bars, the UAV can more easily perform 'aggressive' maneuvers such as airborne landings. In such implementations, prior to landing, the UAV can fix a specific angle that is optimal for perching and self-align with a structure upon landing. It is also noted that fixing the 4-bar linkage angle enables the UAV to optimize thrust force in a specific orientation to apply a certain pressure while performing inspection, maintenance or collecting measurements. Moreover, in some implementation the mounting elements can include some flexibility (e.g., via spring elements) and when the angle is fixed, can provide a higher level of shock absorption. In some embodiments, the fixed X-bar linkage angle could be set by coupling multiple links in the undercarriage by using, for example, a solenoid actuator driven pin running through multiple links, a clutch mechanism, a linear actuator driven pin through multiple links, etc.

Power consumption by the UAV depends on both the configuration of the structure and the orientation of the UAV and undercarriage with respect to the structure. For example, in some orientations of the UAV as shown in FIGS. 4A and 4B, the thrusters remain activated continuously to prevent the drone from falling off of the structure due to gravity. In contrast, when the UAV/undercarriage is positioned on the top of a horizontal structure in a "12 o'clock" position, the thrusters only need to be activated for locomotion. For implementations involving structures with ferromagnetic materials such as steel pipes, the wheels of the undercarriage can include magnetic contacts or electromagnets to keep the wheels attached to the structure surface. Including such materials and/or devices in the wheels can add to the overall weight of the undercarriage and increase power consumption during flight, but also can dramatically reduce power consumption once the UAV/undercarriage system is perched on a structure since the magnetic attraction between the wheels and the structure can bear a significant portion or all of the weight of the UAV. This conserves use of the UAV thrusters for locomotion for such applications.

Figure 5:
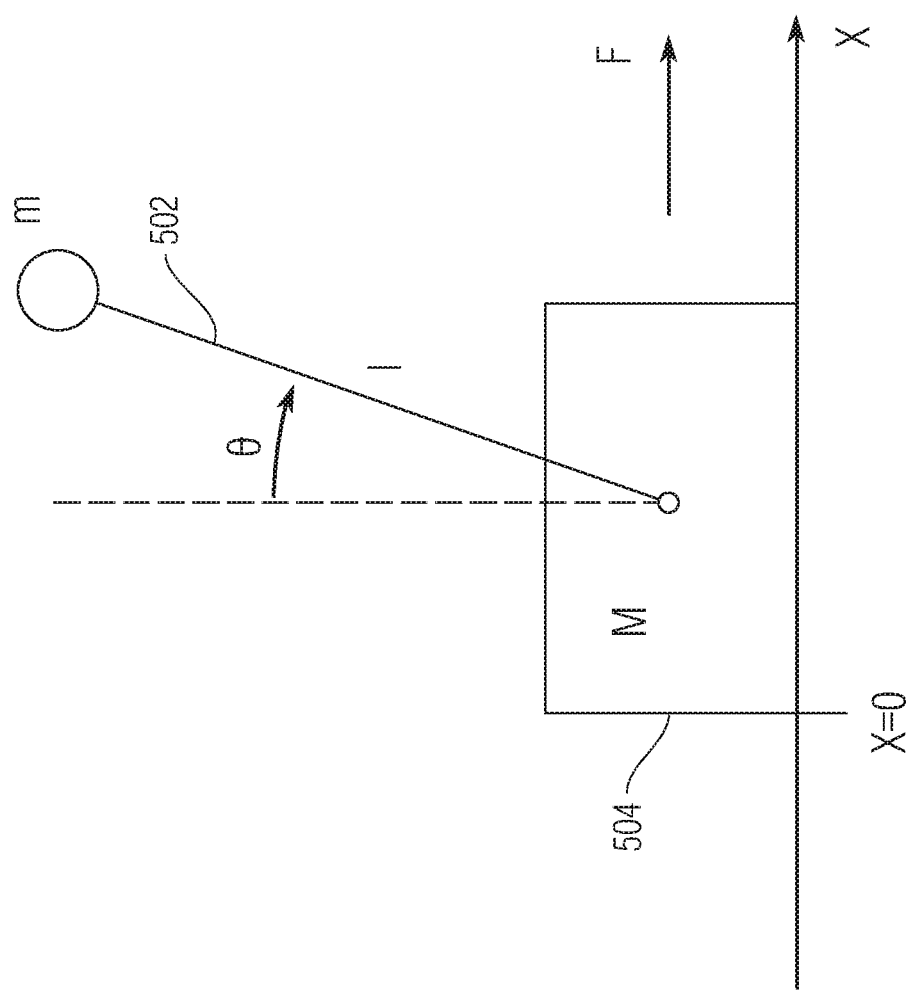
FIG. 5 is a schematic view of an inverted pendulum system.

The UAV and undercarriage system is similar in important respects to the well-known inverted pendulum system, and can be modeled in an analogous way with differences in geometry then taken into account. A schematic view of an inverted pendulum system is shown in FIG. 5. A pendulum 502 of mass (m) is attached in an inverted manner to a cart 504 of mass (M). The problem associated with the inverted pendulum system is to keep the pendulum in an upright position. This problem is challenging due to the fact that the upright position is inherently unstable; the pendulum will tend fall to one side if it tips from an upright position by a small angle. The problem of maintaining the UAV in a centralized position on the undercarriage while remaining attached to a structure presents similar challenges. In terms of a dynamic model, the equations for kinetic and potential energy of the inverted pendulum system are:

$$(M+m)\ddot{x} + ml\ddot{\theta}\cos\theta - ml\dot{\theta}^2\sin\theta = F \qquad (1)$$

$$l\ddot{\theta} + \ddot{x}\cos\theta - g\sin\theta = -f_\theta\dot{\theta} \qquad (2)$$

in which $\ddot{x}$ is the acceleration of the cart (mass M) and pendulum (mass m) in the x-direction, l is the length of the pendulum, $\theta$ is the pendulum angle, F is the applied force, and $f_\theta$ is the friction coefficient for the link where the pendulum is attached to the cart.

By selecting state variables, a set of four non-linear state equations can be derived for describing the system as follows:

$$\dot{x}_1 = \dot{x} = x_2 \qquad (3)$$

$$\dot{x}_2 = \ddot{x} = \frac{-mg\sin x_3 \cos x_3 + ml x_4^2 \sin x_3 + f_\theta m x_4 \cos x_3 + F}{M + (1 - \cos^2 x_3)m}$$

$$\dot{x}_3 = \dot{\theta} = x_4$$

$$\dot{x}_4 = \frac{(M+m)(g\sin x_3 - f_\theta x_4) - (lm x_4^2 \sin x_3 + F)\cos x_3}{l(M + (1 - \cos^2 x_3)m)}$$

State equations analogous to the above can be adapted for the UAV/undercarriage system according to the present invention and can be used in a closed loop control algorithm to model and maintain stability by adjusting the controllable variable, acceleration, both when the system is at rest on a structure and when it is in locomotion.

Figure 6:
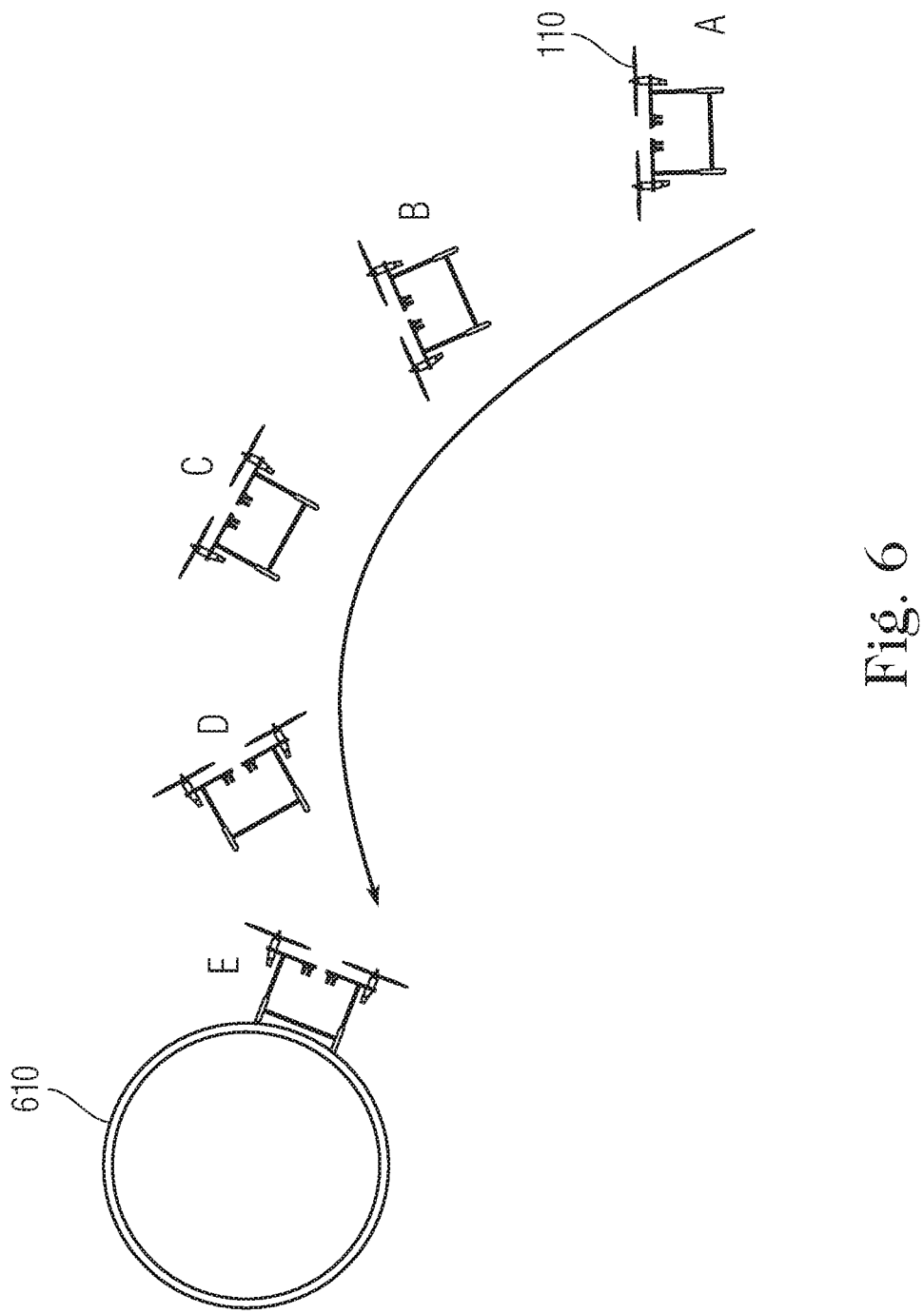
FIG. 6 depicts an example approach and landing sequence for a UAV and undercarraige on a horizontal pipe according to an embodiment of the present invention.

In a further aspect, the control system of the UAV enables the UAV/undercarriage system to approach and land or perch onto surfaces in different configurations. In some cases, the approach is a landing on an unobstructed horizontal pipe. In other cases however, the UAV is controlled to perform more complex approach and landing maneuvers. FIG. 6 depicts an example approach and landing sequence for perching on a horizontal pipe. As shown, in a first stage (A), a UAV with carriage attachment is airborne and is oriented in a "12 o'clock" position in which the undercarriage in oriented horizontally. In a second stage (B), the UAV 110 activates the thrusters in a differential manner to cause the UAV to fly toward the pipe 610 while tilting counterclockwise to an 11 o'clock position. In a third stage (C), as the UAV 110 approaches horizontal pipe 610, the UAV activates the thrusters to bank in an opposite, clockwise direction to a 1 o'clock position in order to slow down for landing. In stage (D), the UAV activates the thrusters differentially (front more than rear) to continue the clockwise rotation to a 2 o'clock position, coming to a 4 o'clock position in stage (E) to land to the side and slightly underneath the pipe 610. In this position, the thrusters remain active to keep the undercarriage from falling off of the pipe.

A similar trajectory for approaching and landing on a vertical pipe is shown in FIG. 7. As shown, in a first stage (A), a UAV 110 with undercarriage attachment is airborne and is oriented in a "12 o'clock" position in which the undercarriage in oriented horizontally. In a second stage (B), the UAV 110 activates the thrusters in a differential manner to cause the UAV to fly toward the pipe 710 while tilting clockwise to a 1 o'clock position. In a third stage (C), as the UA 110 approaches horizontal pipe 710, the UAV activates the thrusters to bank counterclockwise back into the 12 o'clock position in order to slow down for landing. In stage (D), the UAV activates the thrusters differentially (front more than rear) to continue the counterclockwise rotation to an 11 o'clock position, coming to a 9 o'clock position in stage (E) to land sideways on. In this position, the thrusters remain active to keep the undercarriage from sliding and falling off of the pipe.

It should be noted however, with regards to perching maneuvers, that the undercarriage has some ability to self-align on a structure upon landing with a relatively high tolerance for landing errors. This is due to the fact 4-wheeled carriages tend to align when placed on cylindrical surfaces. The theoretical tolerance for landing error is a function of the carriage geometry and the structure size. The track width of the wheel carriage can be either field adjustable for optimal performance on specific structure sizes or the track width can be fixed for specific applications (e.g., structures of known specific sizes). In addition, the self-aligning characteristic of 4-wheeled undercarriages simplifies the mounting of probe normalization of directionally-sensitive sensors. Such sensors require alignment in particular orientations to function properly. For example, using a 4-wheel carriage simplifies mounting ultrasonic dry couple thickness probes in the middle of the carriage for detection of wall thinning and corrosion; the probe merely requires a linear spring-loaded degree of freedom to accommodate for the pipe curvature in order to be aligned correctly.

To reduce the impact when the undercarriage comes into contact with a structure, the undercarriage can include suspension and shock absorbing elements. For example, the wheels can be adapted for shock-absorption. In some implementations, one or more of the linkage bars of the undercarriage can be designed to have some elasticity, for example, the linkages can be telescoping and extendable in one direction or can include springs. Upon landing the linkage bar elements can extend during impact, and then contract back to a neutral position after impact.

In some embodiments, the undercarriage is configured to be mounted at an angle relative to the drone to facilitate certain perching maneuvers. For example, the undercarriage could be mounted at a 90 degree angle relative to the UAV which can facilitate perching on vertical structures, or on top of the UAV to facilitate upside-down perching. FIG. 8 depicts a UAV 810 having an undercarriage 820 mounted at a 90-degree angle. To maintain balance, a counterweight 830 can be used to balance the weight of undercarriage 820 on the opposite side of the UAV 810. In other implementations, the control system of the UAV can be configured to account for the unconventional mounting of the undercarriage.

Figure 9A:
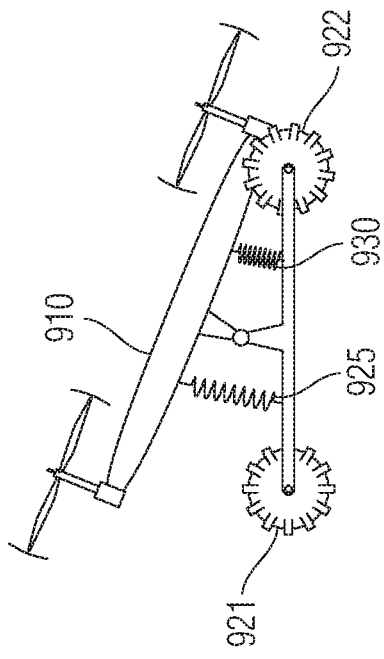
FIGS. 9A and 9B illustrate an alternative embodiment of the present invention in which the UAV is coupled to omni-wheels or mecanum wheels and spring suspension arrangement.
Figure 9B:
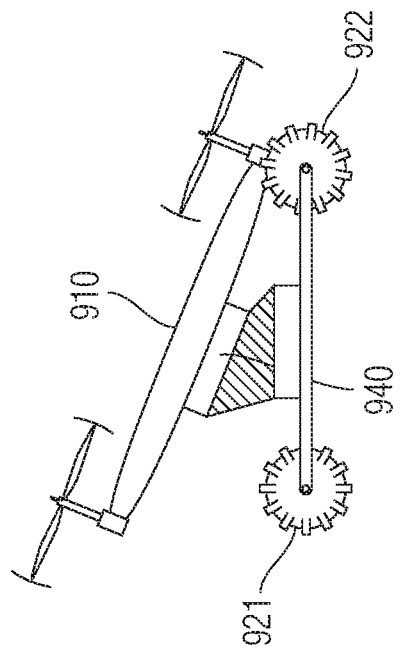
Figure 9C:
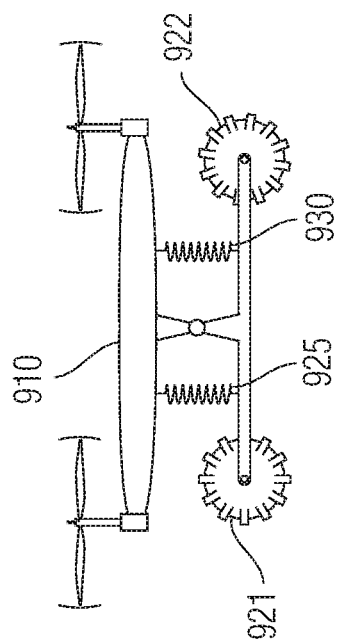
FIGS. 9C and 9D illustrate yet another embodiment of the present invention in which the UAV is coupled to omni-wheels or mecanum wheels and flexible coupling arrangement.
Figure 9D:
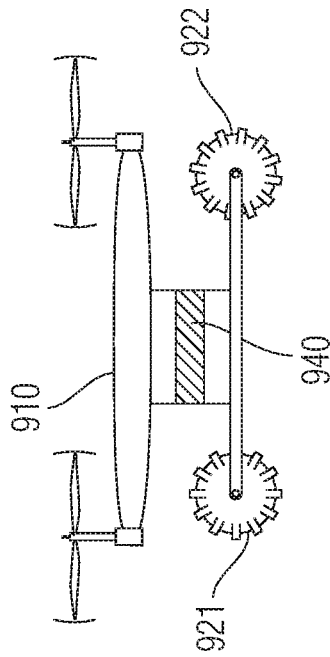

FIGS. 9A and 9B illustrate another embodiment of the present invention in which instead of a 4-wheel undercarriage, the UAV is coupled to omni-wheels or mecanum wheels. As shown, UAV 910 is coupled to omni-wheels e.g., 921, 922 via a two-degree-of-freedom universal joint 925, and neutrally-centered suspension arrangement 930. FIG. 9A shows the embodiment without tilt, while FIG. 9B shows the embodiment in a tilted state. In another related embodiment shown in FIGS. 9C and 9D, UAV 910 is coupled to omni-wheels 921, 922 via a flexible/compressible coupling 940 (e.g., a disk of ester foam) also having additional degrees of freedom. In the embodiments of FIGS. 9A-9D, the combination of the omni-wheels and the additional degree of Freedom between the UAV and the wheels enables the UAV to achieve omnidirectional locomotion on structures, for example, helical and other trajectory patterns.

Figure 10A:
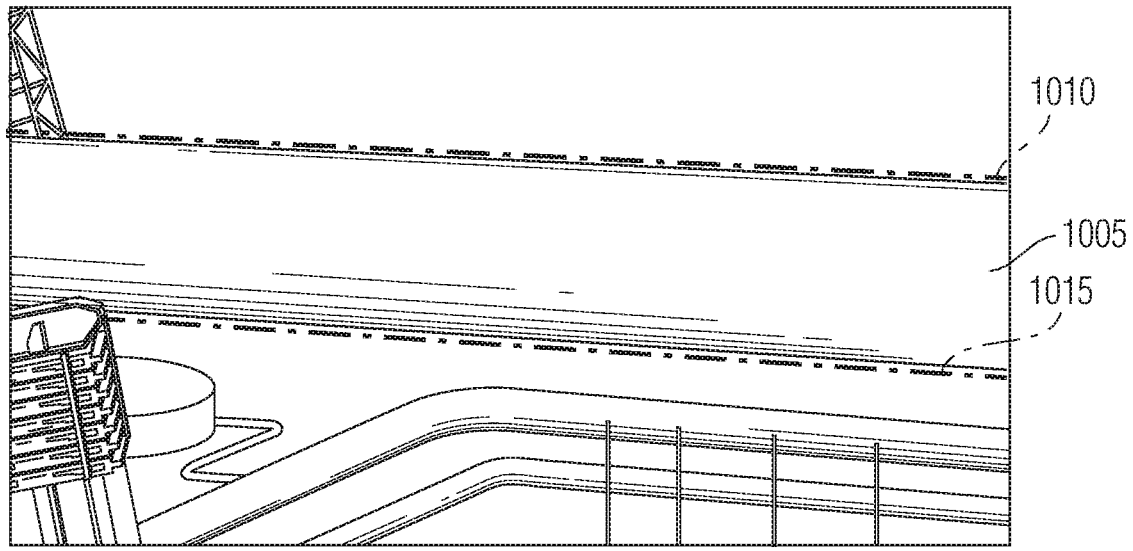
FIG. 10A shows image data obtained by the UAV showing a structure along with automatically generated border reference lines.

In order to optimize the approach and landing of the UAV and undercarriage on a structure, the UAV is equipped with the capability of locating a target in mid-flight in order to set the trajectory for a perching maneuver. In some embodiments, the UAV includes a video camera to capture video data and processes the video data to automatically detect edges of the structure. In other embodiments, a video feed from the camera of a UAV is streamed to an operator interface. In the first embodiment, identification software is used to characterize and identify the edges of the structure by image processing in real-time. Using preset data regarding the diameter of a structure, the UAV determines an estimated distance and location of the structure. In some implementation, other sensors can be used to identify the location of the structure such as a laser rangefinder or LiDAR. FIG. 10A shows image data obtained by the UAV showing a structure 1005. By known image processing techniques, the UAV determines the boundaries of the structures 1005, shown by reference lines 1010, 1015. Upon identification of the distance and location, the UAV can automatically determine a trajectory to reach the edge of the structure safely. Alternatively, upon determination of the distance and location a signal can be sent to an operator interface to commence a perching maneuver.

Figure 10B:
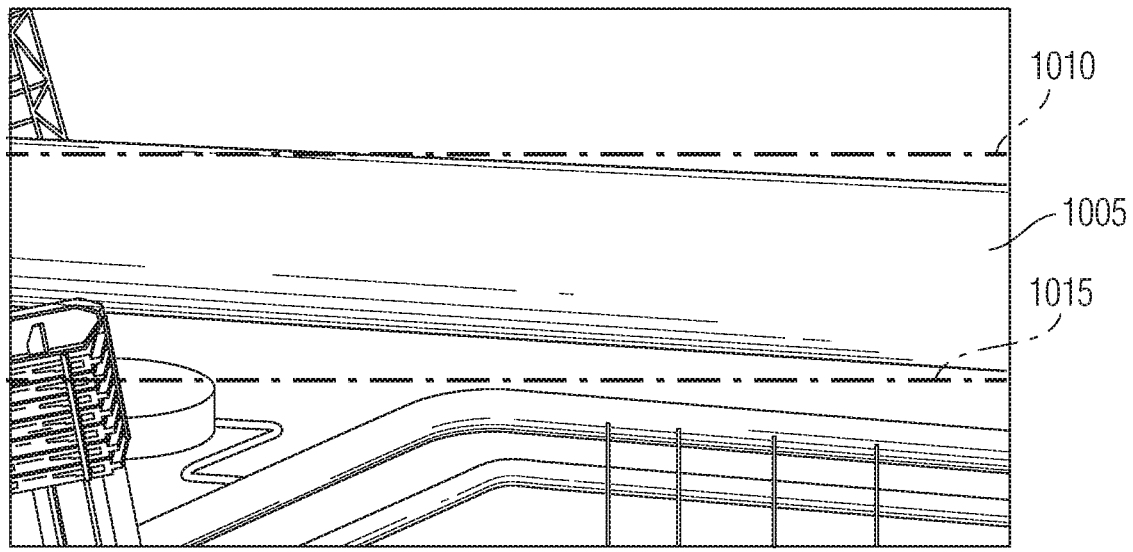
FIG. 10B shows image data obtained by the UAV showing a structure along with manually generated border reference lines.

In the second embodiment, the video stream on the operator interface can be graphically overlaid with reference lines. An example of a video image of a structure 1005 including approximated reference lines 1020, 1025 is shown in FIG. 10B. The reference lines 1020, 1025 give approximate boundaries of the structure 1005. An operator can use the reference lines as guides for manually controlling and stabilizing the UAV. Once the UAV is stable and the edges of the structure 1005 line up with the visual references 1020, 1025, the orientation of the UAV with respect to the camera is established. As in the first embodiment, the UAV is programmed to determine the distance and direction to the structure based on the angle at which the camera is mounted. The UAV can then calculate a trajectory to land on the structure.

Figure 11:
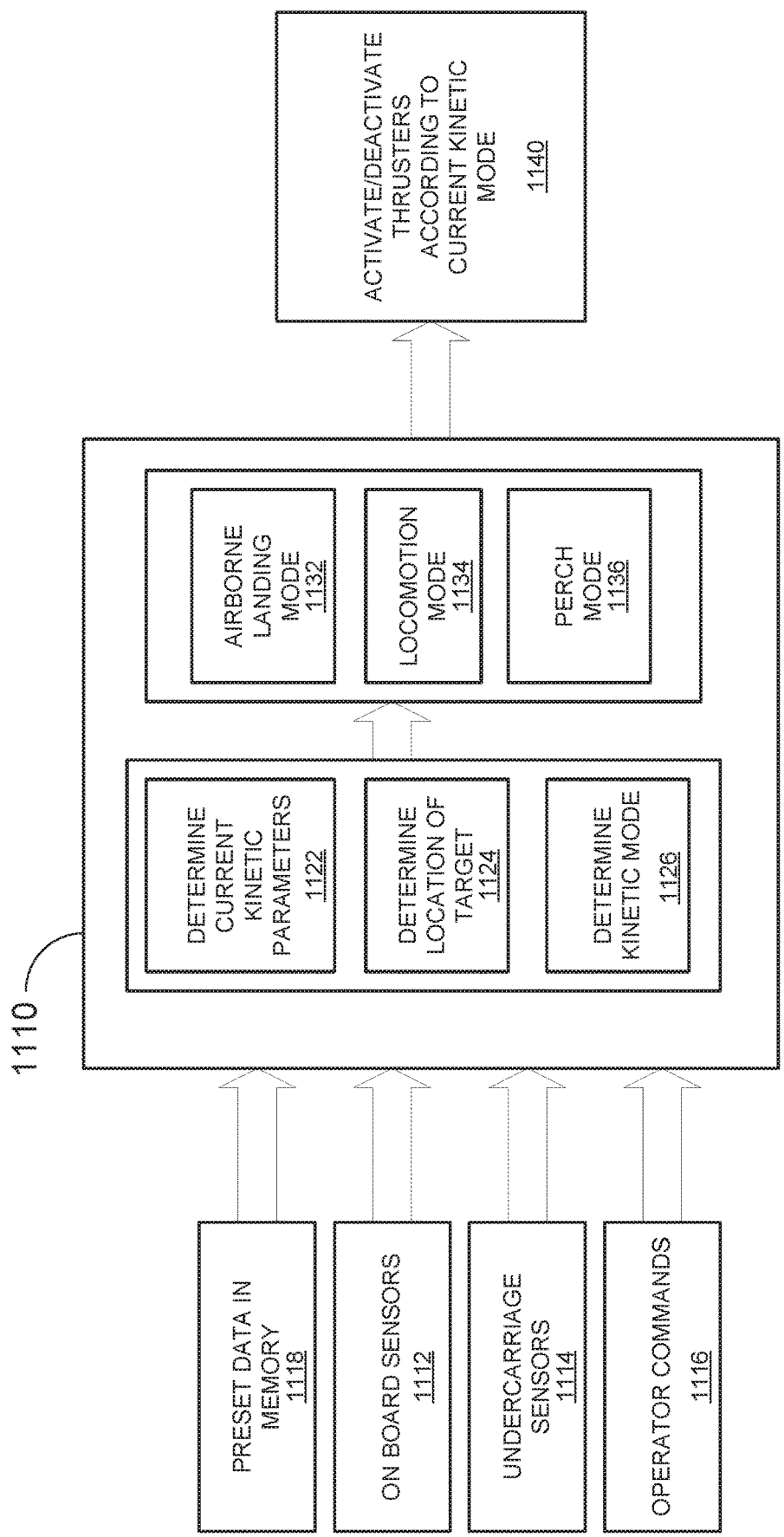
FIG. 11 is a schematic view of a control system for operating a UAV and uncarriage system according to an embodiment of the present invention.

FIG. 11 illustrates a control system for controlling a UAV and undercarriage according to an embodiment of the present invention. The control system comprises a processor 1110 on board the UAV. The processor 1110 receives input from on-board sensors 1112 which can include altitude, inertial measurement, laser, and ultrasonic sensors, among other possible sensor types. Processor 1110 also receives data input from sensors 1114 mounted on the undercarriage including pressure sensors, operator instruction commands 1116 and preset inputs 1118 from on-board memory. The preset inputs 1118 can include, but is not limited to, target locations, trajectory patterns, inspection task parameters, and basic information including the mass of the UAV and undercarriage.

Using the inputs, the processor 1110 makes a first set of computations regarding the present kinetic state of the UAV. Firstly, processor determines current kinetic parameters 1122 including the speed, momentum location and orientation of the UAV and undercarriage. Based on a target that can be preset or assigned by operator input, the processor 1110 uses sensor input to determine the precise location (distance, orientation) 1124 of the target from the UAV. When the UAV is airborne, the target can be a landing location on a target structure. When the UAV and undercarriage are perched at a particular location on a structure, the target can be another location on the structure to which the UAV/undercarriage are to move by locomotion. From the kinetic parameters and target location, the processor 1110 also determines an appropriate kinetic mode 1126. If the UAV is airborne, the kinetic mode is a flight mode 1132. If the UAV is perched on a structure but has not reached a target location on the surface of the structure, the kinetic mode is a locomotion mode 1134. Alternatively, if the UAV is perched at the target location, the kinetic mode is a perch mode 1136.

Each of the kinetic modes requires a specific algorithm for controlling the thrusters depending on the kinetic parameters. The flight mode 1132 requires the UAV to calculate a trajectory for approaching and landing on a target structure, including the different speeds and orientations this requires during different stages of the approach as shown in FIGS. 6 and 7. This requires continuous calculations in real time to ensure that the orientation and speed of the UAV are within an appropriate range at all times of the approach. The locomotion mode 1134, which is particularly significant in the context of the present invention, requires the UAV to calculate the differential activation of the thrusters of the UAV required to induce motion of the undercarriage at a suitable speed and direction. The locomotion mode 1134 uses continual input from the undercarriage sensors 1114 to check that the wheels of the carriage are in contact with the surface of the structure with an appropriate pressure to ensure attachment. The locomotion mode 1134 can work in tandem with the perch mode 1136 (or include similar program code) to ensure that the undercarriage remains attached to the structure during locomotion. Given the many different ways in which the undercarriage can be oriented with respect to the structure, e.g., on top, sideways, upside-down, the perch mode continually determines from sensor input and kinetic parameters whether the undercarriage is stable on the surface of the structure according to its orientation with respect to the structure and the force of gravity (absolute orientation), and update the thruster activation accordingly to maintain continual stability. Thus, the output of the various modes is a continuous stream of data for modifying the thruster activation/deactivation 1140 of the UAV.

The system and methods of the present invention can be advantageously applied in numerous inspection and monitoring processes. For example, the UAV and undercarriage system be used to inspect insulated pipes. The inspection can be conducted in close proximity based visual inspection in close proximity and/or the UAV or undercarriage can include sensors such as pulsed eddy current technology or electromagnetic acoustic transduction. Embodiments of the present invention can also be used for inspection of elevated metallic pipes. The UAV has the ability to reach areas that are difficult for other inspection apparatus to reach such as pipe segments located past obstacles. The UAV and undercarriage system can also be used to capture images or video of photonic smart coatings for nonmetallic pipe inspection.

The system described herein can be expanded and highly automated in industrial environments. For example, industrial facilities can maintain small fleets of UAVs in a storage base (e.g., a hangar) controlled from a central command center. The fleet can be configured with a map of a facility layout and network such that inspection tasks can be either scheduled to run on a certain frequency or by operator command. Then, upon preset or operator command, UAVs can autonomously fly out from the storage area, navigate through the facility, perch onto targeted structures, conduct relevant tasks and then return to the storage base.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for landing and locomoting on a surface of a structure comprising:
an unmanned aerial vehicle having a plurality of independently controllable thrusters; and an undercarriage including a frame having a plurality of corners, a set of wheels with each wheel coupled to a respective corner of the frame, and a plurality of bars pivotally coupled at respective first ends to the frame and coupled at respective second ends to the unmanned aerial vehicle,
wherein the unmanned aerial vehicle is operative to differentially activate the plurality of thrusters so as to tilt with respect to the frame of the undercarriage and to exert a net resultant force that causes the undercarriage to locomote on the surface of the structure,
wherein the unmanned aerial vehicle includes a processor configured with program code for controlling kinetic behavior of the unmanned aerial vehicle according to a flight mode, a locomotion mode, and a perch mode,
wherein in flight mode, the processor determines a location and orientation of the surface of the structure relative to the unmanned aerial vehicle and calculates a) a trajectory for landing the unmanned aerial vehicle onto a target location on the surface of the structure from an airborne position based on the determined location and orientation, and b) a sequence in which to activate and deactivate the thrusters in order to move in the calculated trajectory.

2. The system of claim 1, wherein the plurality of bars includes four bars configured in an X-shaped arrangement.

3. The system of claim 1, wherein the set of wheels includes four wheels and the undercarriage includes pressure sensors operative to indicate a force of contact between the set of wheels and the surface of the structure.

4. The system of claim 1, wherein the unmanned aerial vehicle includes an optical sensor and the processor is configured with program code for image processing and identification.

5. The system of claim 1, wherein at least one of the undercarriage and the unmanned aerial vehicle includes equipment for inspecting the surface of the structure.

6. The system of claim 1, wherein the wheels of the undercarriage are one of omni-wheels and mecanum wheels.

7. A system for landing and locomoting on a surface of a structure comprising:
an unmanned aerial vehicle having a plurality of independently controllable thrusters; and an undercarriage including a frame having a plurality of corners, a set of wheels with each wheel coupled to a respective corner of the frame, and a plurality of bars pivotally coupled at respective first ends to the frame and coupled at respective second ends to the unmanned aerial vehicle,
wherein the unmanned aerial vehicle is operative to differentially activate the plurality of thrusters so as to tilt with respect to the frame of the undercarriage and to exert a net resultant force that causes the undercarriage to locomote on the surface of the structure,
wherein the unmanned aerial vehicle includes a processor configured with program code for controlling kinetic behavior of the unmanned aerial vehicle according to a flight mode, a locomotion mode, and a perch mode,
wherein in perch mode, the processor determines an orientation of the undercarriage with respect to gravity and the surface of the structure and activates the thrusters so as to keep the wheels of the undercarriage in contact with the surface of the structure.

8. A system for landing and locomoting on a surface of a structure comprising:
an unmanned aerial vehicle having a plurality of independently controllable thrusters; and an undercarriage including a frame having a plurality of corners, a set of wheels with each wheel coupled to a respective corner of the frame, and a plurality of bars pivotally coupled at respective first ends to the frame and coupled at respective second ends to the unmanned aerial vehicle,
wherein the unmanned aerial vehicle is operative to differentially activate the plurality of thrusters so as to tilt with respect to the frame of the undercarriage and to exert a net resultant force that causes the undercarriage to locomote on the surface of the structure,
wherein the unmanned aerial vehicle includes a processor configured with program code for controlling kinetic behavior of the unmanned aerial vehicle according to a flight mode, a locomotion mode, and a perch mode,
wherein in locomotion mode, the processor determines a location and an orientation of the undercarriage with respect to gravity, and the surface of the structure and calculates a trajectory for locomoting the unmlanned aerial vehicle on the surface of the structure to a target location on the structure based on the determined location and orientation.

9. A method of landing and locomoting on a surface of a structure using an unmanned aerial vehicle having controllable thrusters, the method comprising:
coupling an undercarriage including a frame having a plurality of corners, a set of wheels with each wheel coupled to a respective corner of the frame, and a plurality of pivotable bars to the unmanned aerial vehicle;
controlling the thrusters of the unmanned aerial vehicle so as to tilt the pivotable bars of the undercarriage with respect to the frame and exert a resultant force on the undercarriage that causes the undercarriage to locomote on the surface of the structure;
determining a kinetic mode for the unmanned vehicle consisting of one of a flight mode, a locomotion mode, and a perch mode; and
in flight mode, determining a location and orientation of the surface of the structure relative to the unmanned aerial vehicle and calculating a) a trajectory for landing the unmanned aerial vehicle onto a target location on the surface of the structure from an airborne position based on the determined location and orientation, and b) a sequence in which to activate and deactivate the thrusters in order to move in the calculated trajectory.

10. The method of claim 9, wherein the unmanned aerial vehicle includes a plurality of thrusters and the controlling of the thrusters includes differentially activating the plurality of thrusters to obtain a net resultant force.

11. The method of claim 9, wherein the plurality of pivotable bars of the undercarriage includes four bars configured in an X-shaped arrangement.

12. The method of claim 9, further comprising detecting a pressure on the set of wheels of the undercarriage indicative of a force of contact between the set of wheels and the surface of the structure.

13. The method of claim 9, further comprising optically detecting a surface of the structure and determining a location of the unmanned aerial vehicle with respect to the surface of the structure based on the optical detection.

14. The method of claim 9, further comprising inspecting the surface of the structure.

15. The method of claim 9, further comprising fixing the pivotable bars at a specific angle with respect to the undercarriage.

16. A method of landing and locomoting on a surface of a structure using an unmanned aerial vehicle having controllable thrusters, the method comprising:
- coupling an undercarriage including a frame having a plurality of corners, a set of wheels with each wheel coupled to a respective corner of the frame, and a plurality of pivotable bars to the unmanned aerial vehicle;
- controlling the thrusters of the unmanned aerial vehicle so as to tilt the pivotable bars of the undercarriage with respect to the frame and exert a resultant force on the undercarriage that causes the undercarriage to locomote on the surface of the structure;
- determining a kinetic mode for the unmanned vehicle consisting of one of a flight mode, a locomotion mode, and a perch mode; and
- in perch mode, determining an orientation of the undercarriage with respect to gravity and the surface of the structure and activating the thrusters so as to keep the wheels of the undercarriage in contact with the surface of the structure.

17. A method of landing and locomoting on a surface of a structure using an unmanned aerial vehicle having controllable thrusters, the method comprising:
- coupling an undercarriage including a frame having a plurality of corners, a set of wheels with each wheel coupled to a respective corner of the frame, and a plurality of pivotable bars to the unmanned aerial vehicle;
- controlling the thrusters of the unmanned aerial vehicle so as to tilt the pivotable bars of the undercarriage with respect to the frame and exert a resultant force on the undercarriage that causes the undercarriage to locomote on the surface of the structure;
- determining a kinetic mode for the unmanned vehicle consisting of one of a flight mode, a locomotion mode, and a perch mode; and
- in locomotion mode, determining a location and an orientation of the undercarriage with respect to gravity and the surface of the structure and calculating a trajectory for locomoting the unmanned aerial vehicle on the surface of the structure to a target location on the structure based on the determined location and orientation.

* * * * *